United States Patent
Beckerman

[11] Patent Number: 5,839,006
[45] Date of Patent: Nov. 17, 1998

[54] APPARATUS AND METHOD FOR DIRECTING LIGHT FROM A SWIVEL FLASH HEAD

[76] Inventor: Arnold Edward Beckerman, Star Rte 70, Box 98C, Great Barrington, Mass. 01230

[21] Appl. No.: 739,837

[22] Filed: Oct. 30, 1996

[51] Int. Cl.$^6$ ............................. G03B 15/03; G03B 15/02
[52] U.S. Cl. .............................. 396/174; 396/200; 362/18
[58] Field of Search .................................... 396/154, 174, 396/175, 188, 198, 200; 362/7, 16, 18

[56] References Cited

U.S. PATENT DOCUMENTS

| | | | |
|---|---|---|---|
| 3,855,602 | 12/1974 | Hoos | 396/175 |
| 4,066,885 | 1/1978 | Weinberg | 362/18 |
| 4,091,402 | 5/1978 | Siegel | 396/175 |
| 4,251,854 | 2/1981 | Kaneko et al. | 395/200 |
| 5,095,325 | 3/1992 | Carstens | 396/200 |
| 5,154,503 | 10/1992 | Sternsher | 362/16 |
| 5,556,186 | 9/1996 | Pilby | 362/16 |

OTHER PUBLICATIONS

Stroboframe Flash Brackets and Accessories product pamphlet, 1992, 16 pages.
Lumiquest Photographic Accessories product pamphlet, (date unknown, pamplet distributed to inventor between Nov. 1995 and 1996), 3 pages.
S. Sint, "Sint's View" column, Popular Photography, Feb. 1996, pp. 78–79.

*Primary Examiner*—Safet Metjahic
*Assistant Examiner*—Nicholas J. Tuccillo
*Attorney, Agent, or Firm*—Sterne, Kessler, Goldstein & Fox, P.L.L.C.

[57] ABSTRACT

A simple, effective apparatus and method for directing light from a swivel flash head at positions above a camera lens unit when the camera is oriented in horizontal and vertical camera orientations is provided. Lighting is provided for a camera having a camera lens unit by mounting a swivel flash head on the camera and attaching a reflector to the swivel flash head. The reflector is preferably mounted to the swivel flash head by removably attachable fasteners, such as, Velcro fastening strips. In one embodiment, the reflector is an integral "shell" reflector. The shell reflector has a neck region for mounting the reflector to the swivel flash head and a reflective region for redirecting light emitted by the swivel flash head to illuminate a camera field of view. The reflective region can further include shaped contoured regions for producing a soft, diffuse light of portrait quality with less harsh shadow. An asymmetric shape adds fill light. Finally, the integral shell reflector is preferably made of sturdy, molded plastic with a reflective interior surface.

22 Claims, 7 Drawing Sheets

APPARATUS AND METHOD FOR DIRECTING LIGHT FROM A SWIVEL FLASH HEAD

BACKGROUND OF THE INVENTION

1. Field of the Invention

The present invention relates to camera lighting. More particularly, the present invention relates to a reflective attachment for an on-camera swivel flash head.

2. Related Art

High quality photography requires natural lighting and visually flattering shadow. A conventional rule of thumb in professional photography is to position a flash above a camera lens unit. A flash positioned above a camera lens strikes a camera subject at a downward angle, like sunlight and other common light sources. A flash positioned above the camera lens then produces more natural lighting with less unflattering shadow or glare. This more natural look is obtained when the flash is in a range of positions above the camera lens, that is, either directly above the camera lens or above the camera lens and off to either side of the camera within an angular range of approximately ±60 degrees from the axis directly above the camera lens.

On-camera flash attachments often mount a flash head on the top or side of a camera such that light from the flash head is positioned above the camera lens for certain camera orientations. On-camera flashes, however, have a limited range of motion before the light is no longer above the camera lens. For example, when flash heads are mounted on top of a camera, light is aligned above the camera lens for taking horizontal pictures. But when the camera is turned for a vertical picture, the on-camera flash head mounted on top of the camera extends to the side of the camera lens. Even on-camera swivel flash heads, which allow light to be directed over an even greater range of angles, do not remain above a camera lens for both horizontal and vertical camera orientations. Photographic accessories for on-camera swivel flash heads, such as the product line of light bouncers and diffusers sold by Lumiquest, also do not position an on-camera flash above a camera lens for both horizontal and vertical camera orientations.

One solution to this problem is to provide a separate bracket system for mounting a flash and a camera. For example, Stroboframe systems manufactured by The Saunders Group, provide brackets and other mounts that provide a separate support for a flash above a camera lens. These separate brackets and mounts allow the camera unit to be turned independently from the flash unit in horizontal and vertical orientations. Such brackets and mounts, however, are expensive, heavy, and unwieldy. The brackets and mounts have to be mechanically adjusted and often are not adaptable to different camera models.

What is needed then is a simple, effective method and apparatus for providing an on-camera lighting where the light is positioned above a camera lens unit when the camera is oriented in horizontal and vertical camera orientations.

SUMMARY OF THE INVENTION

The present invention provides a simple, effective method and apparatus for directing light from positions above a camera lens unit when the camera is oriented in horizontal and vertical camera orientations.

According to the present invention, lighting is provided for a camera having a camera lens unit by mounting a swivel flash head on the camera and mounting a reflector to the swivel flash head. Light emitted from the swivel flash head reflects from the reflector such that the light is positioned above the camera lens unit when the camera is oriented within a range of camera orientations including horizontal and vertical camera orientations.

The reflector is preferably mounted to the swivel flash head such that the reflector is flush with a side of the swivel flash head. To mount the reflector to a side of the swivel flash head, the reflector is preferably attached to the swivel flash head by removably attachable fasteners, such as, Velcro fastening strips. Fasteners can be attached on any part of the swivel flash head including or not including the sides of the swivel flash head.

In one embodiment, the reflector is an integral "shell" reflector. The shell reflector has a neck region for mounting the reflector to the swivel flash head and a reflective region for redirecting light emitted by the swivel flash head to illuminate a camera field of view. The reflector further includes an entrance opening positioned between the neck and reflective regions and an exit opening positioned adjacent to the reflective region and substantially perpendicular to the entrance opening. The reflective region re-directs light received through the entrance opening to pass out of the exit opening. The reflective region is preferably the entire three-dimensional concave surface area inside the reflector. The reflective region can further include shaped contoured regions for softening light from a flash, providing fill light, and reducing shadow.

In the integral shell reflector, the entrance and exit openings both join at two common points A and B. The entrance opening includes three sides arranged in an approximately rectangular U-shape between points A and B, while the exit opening has an arcuate member that follows an arcuate path between points A and B. The arcuate path can be any path, such as, an approximately shell-shaped arc, an approximately spherical arc, an approximately elliptical arc, or an approximately U-shaped arc, an approximately teardrop shaped arc, or an approximately asymmetric tearshaped arc.

The integral shell reflector is preferably made of sturdy, molded plastic with a reflective interior surface.

The above integral shell reflector embodiment is illustrative not limiting. Other shapes, surface contours, and configurations can be used. For example, straight line segments and right angles can also be included in the exit opening. The reflective region can re-direct light from the swivel flash head by more or less than 90 degrees.

By positioning light from an on-camera flash above a camera lens unit when the camera is oriented in horizontal and vertical camera orientations, the present invention overcomes an industry problem simply and effectively. Harsh shadows and red eye are reduced or eliminated. Soft portrait quality lighting is achieved.

Further features and advantages of the present invention, as well as the structure and operation of various embodiments of the present invention, are described in detail below with reference to the accompanying drawings.

BRIEF DESCRIPTION OF THE FIGURES

The file of this patent contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art make and use the invention.

FIG. 3A further shows the redirection of light through the integral shell reflector.

The present invention will now be described with reference to the accompanying drawings. In the drawings, like reference numerals indicate identical or functionally similar elements. Additionally, the left-most digit(s) of a reference number typically identifies the drawing in which the reference number first appears.

DETAILED DESCRIPTION OF THE
PREFERRED EMBODIMENTS

Table of Contents

I. Overview and Terminology
II. Example Environment
III. Reflector Mounted on a Swivel Flash Head
IV. Integral Shell Reflector
   a. Design
   b. Example Starting Instructions
      i. Mounting the Reflector
      ii. Positioning Reflector on Swivel Flash Head
      iii. Getting Started
   c. Comparison Test
V. Reflector Mounted on a Potato Masher Style Swivel Flash Head
VI. Conclusion I. Overview and Terminology The present invention provides a simple, effective method and apparatus for directing light from an on-camera flash such that the light is positioned above a camera lens unit when the camera is oriented in horizontal and vertical orientations.

"Camera," as used herein to describe the present invention, refers to any type of camera which can support a swivel flash head. A camera can include, but is not limited to, a hand-held camera, single lens reflex camera, 35 millimeter film camera, square format camera, smart camera, or video camera. "On-camera flash," refers to any flash head mounted directly or indirectly through intermediate attachments, brackets or other support means, to any side of a camera.

"Camera lens unit," as used herein to describe the present invention, refers to one or more lenses in the camera that focus incident light for recording upon an imaging film or electronic device. A camera lens unit can include, but is not limited to, any single lens or combination of lenses used in photography.

"Swivel flash head," as used herein to describe the present invention, refers to any flash head that can be mounted on a camera (either directly or through intermediate attachment means) and pointed to emit light toward the left and/or right sides of a camera. Any type of light source can be used in a swivel flash head including a continuous light source, a single flash, and a strobe or other type of intermittent flash. A swivel flash head can include, but is not limited to, a flash head that points fixedly to the left and/or right sides of the camera, and a flash head that swivels over a range of positions including pointing left, forward, right, up and/or down. Examples of a swivel flash head suitable for use in the present invention include, but are not limited to the following manufacturers and models:

| Manufacturer | Model |
| --- | --- |
| Achiever | 630AF, 632LCD |
| Canon | 430EZ, 540EZ |
| Contax | TLA 360 |
| Metz | 40M Z-2 |
| Minolta | 5400HS |
| Nikon | SB24, SB25, SB26 |
| Nissin | 360TW |
| Nistar | AZ300 Zoom, TZ320, Twin Zoom |
| Olympus | G40 |
| Phoenix | ZIF-105 N |
| Pentax | AF500FTZ |
| Quantum | Q flash QFT |
| Sigma | 430 |
| Sunpak | 333 Super, 433AF, 544 |
| Vivitar | 636AF |

"Swivel flash head," as used herein to describe the present invention, can include potato masher style flash heads. Examples of a potato masher style flash suitable for use in the present invention include, but are not limited to, the following manufacturers and models:

| Manufacturer | Model |
| --- | --- |
| Metz | 60CT |
| Norman | 200B, 400B |

II. Example Environment

The present invention is described in terms of an on-camera flash environment. Description in these terms is provided for convenience only. It is not intended that the invention be limited to application in this example environment. In fact, after reading the following description, it will become apparent to a person skilled in the relevant art how to implement alternative environments of the invention.

III. Reflector Mounted on a Swivel Flash Head

Figure 1:
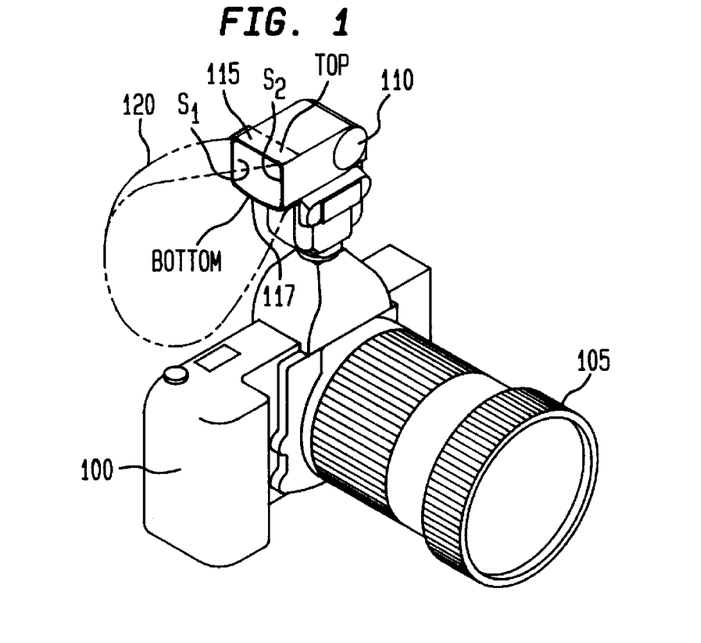
FIG. 1 shows a reflector for directing light from an on-camera swivel flash head according to the present invention.

FIG. 1 shows a conventional camera 100 and camera lens unit 105 having a swivel flash head 110 mounted on top of the camera 100. According to the present invention, a reflector 120 is mounted flush with side $S_1$ of the swivel flash head 110. Alternatively, reflector 120 can be mounted flush with side $S_2$ of the swivel flash head 110.

To mount the reflector 120 to side $S_1$ (or side $S_2$) of the swivel flash head 110, the reflector 120 is preferably attached to the swivel flash head 110 by fasteners. Fasteners can be attached on any part of the swivel flash head 110 including the top, bottom and/or sides $S_1$, $S_2$ of the swivel flash head 110. In FIG. 1, two fasteners 115, 117, such as Velcro® fastening strips, are used along the top and bottom of the swivel flash head 110 to removably attach the reflector 120. In general, any type of permanent or removable fastener can be used, including but not limited to, fastening strips, elastic bands, clamps, glue, brackets, screws, clips, tabs, etc.

Reflector 120 is shaped to re-direct light traveling from the swivel flash head 110 to illuminate the field of view of camera 100. In the example shown in FIG. 1, the reflector 120 reflects light from the swivel flash head 110 approximately 90 degrees. As a result, when the swivel flash head 110 is pointed in a plane lying approximately perpendicular to an optical axis of the camera lens unit 105, the reflector 120 re-directs light from the swivel flash head 110 away from the camera 100 to illuminate the camera's field of view.

Figure 2:
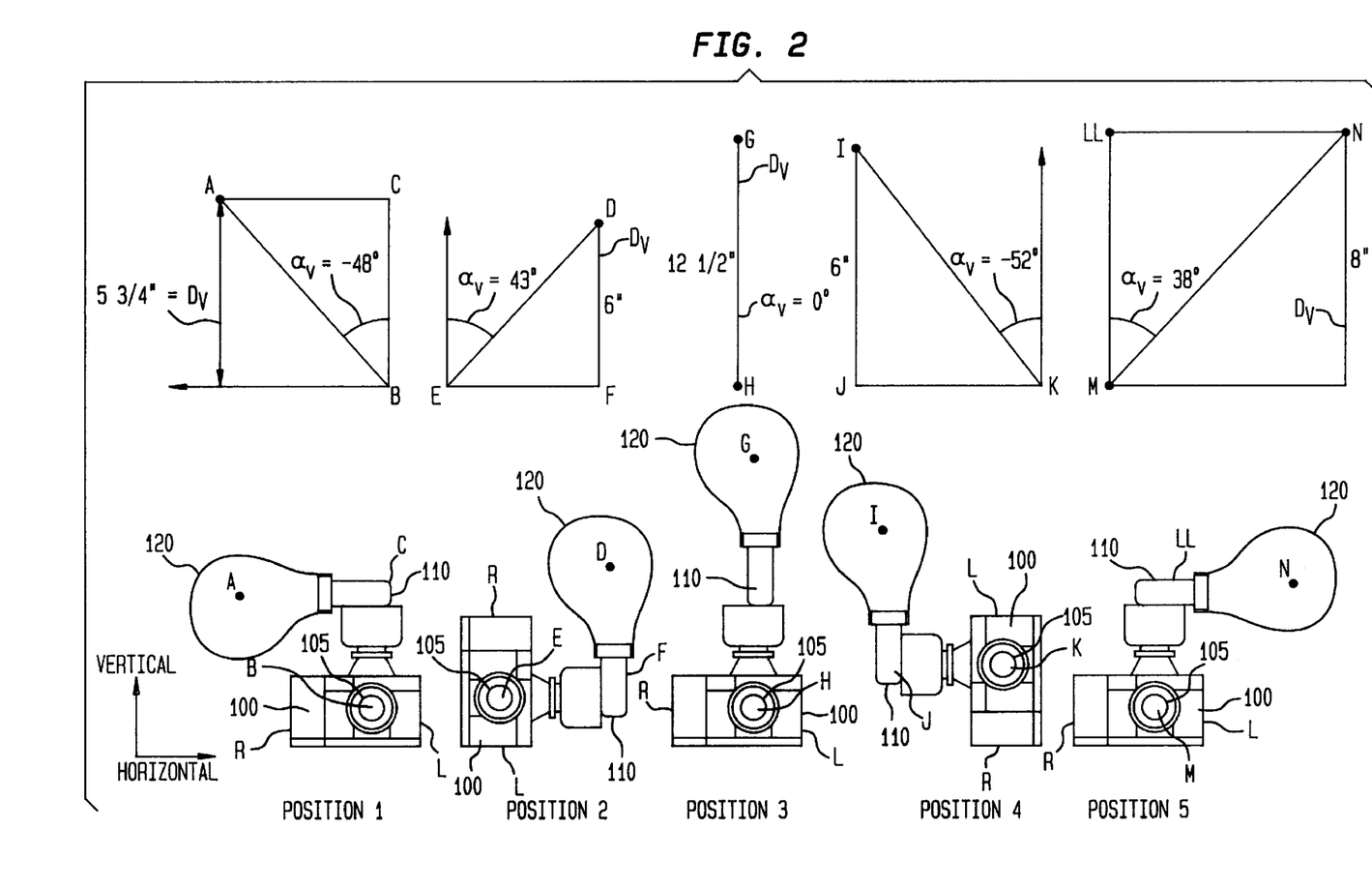
FIG. 2 shows five different camera orientations using the reflector of FIG. 1.

Moreover, by attaching the reflector 120 to a side $S_1$ or $S_2$ of the swivel flash head 110, the reflector 120 can be easily positioned above the camera lens unit 105 over a range of camera orientations including horizontal and vertical camera orientations. FIG. 2 shows examples of the FIG. 1 embodiment positioned in five different camera orientations (labeled position 1 to position 5). The symbols R and L are added to denote right and left sides of the camera 100. All dimensions are given in approximate values rounded to whole numbers.

In all of the positions 1 to 5, the position of light directed from the reflector 120 is above the camera lens unit 105. In positions 1 to 5, light from the swivel flash head 110 is centered by reflector 120 at spots A, D, G, I, N, respectively. Moreover, in the example of FIG. 2, each spot A, D, G, I, N is positioned substantially above the camera lens unit 105; that is, each spot is positioned above the camera lens unit 105 by a vertical displacement $D_v$ within a range of approximately 5 to 13 inches and an offset angle $\alpha_v$ within a range of approximately +60 degrees to −60 degrees from vertical. These ranges are illustrative only. Larger and smaller range values for the vertical displacement and offset angle can be used as long as the vertical displacement is at least greater than zero and the offset angle is within the range of ±90 degrees.

As shown in position 1, when the camera 100 is positioned in a horizontal orientation to take a horizontal picture and the swivel flash head 110 points to the right, reflector 120 centers light from the swivel flash head 110 at a spot A substantially above the camera lens unit 105 with a vertical displacement $D_v$ equal to approximately 5¾ inches and an offset angle $\alpha_v$ equal to approximately −48 degrees from vertical.

As shown in position 2, when the camera 100 is oriented in a vertical camera orientation to take a vertical picture and the swivel flash head 110 points to the right, the reflector 120 centers light from the swivel flash head 110 at a spot D substantially above the camera lens unit 105 with a vertical displacement $D_v$ equal to approximately 6 inches and an offset angle av equal to approximately 43 degrees from vertical. In position 3, when the camera 100 is oriented in a horizontal camera orientation to take a horizontal picture and the swivel flash head 110 points upward, the reflector 120 centers light from the swivel flash head 110 at a spot G substantially above the camera lens unit 105 with a vertical displacement $D_v$ equal to approximately 12½ inches and an offset angle $\alpha_v$ equal to approximately 0 degrees from vertical.

In position 4, when the camera 100 is oriented in a vertical camera orientation to take a vertical picture and the swivel flash head 110 points to the left, the reflector 120 centers a light from the swivel flash head 110 at a spot I substantially above the camera lens unit 105 with a vertical displacement $D_v$ equal to approximately 6 inches and an offset angle $\alpha_v$ equal to approximately −52 degrees from vertical. Finally, in position 5, when the camera 100 is positioned in a horizontal orientation to take a horizontal picture and the swivel flash head 110 points to the left, reflector 120 centers light from the swivel flash head 110 at a spot N substantially above the camera lens unit 105 with a vertical displacement $D_v$ equal to approximately 8 inches and an offset angle $\alpha_v$ equal to approximately 38 degrees from vertical.

Figure 5:
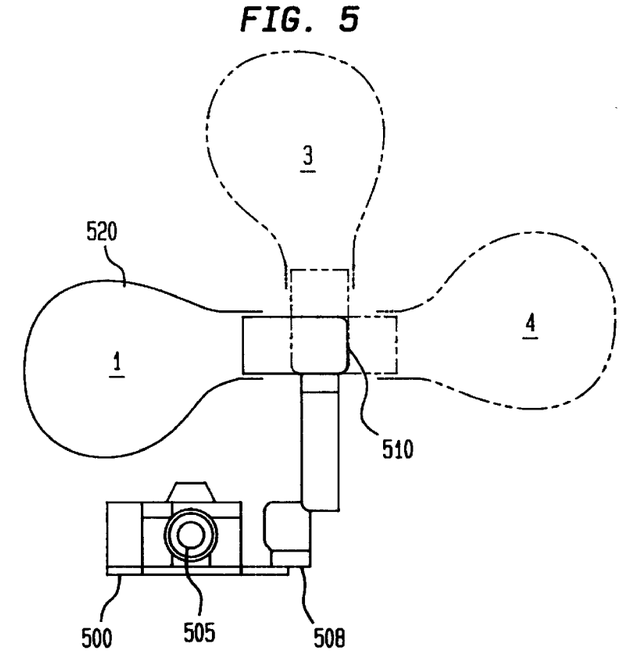
FIG. 5 shows a reflector for directing light from a potato-masher style flash according to a second embodiment of the present invention.
Figure 6A:
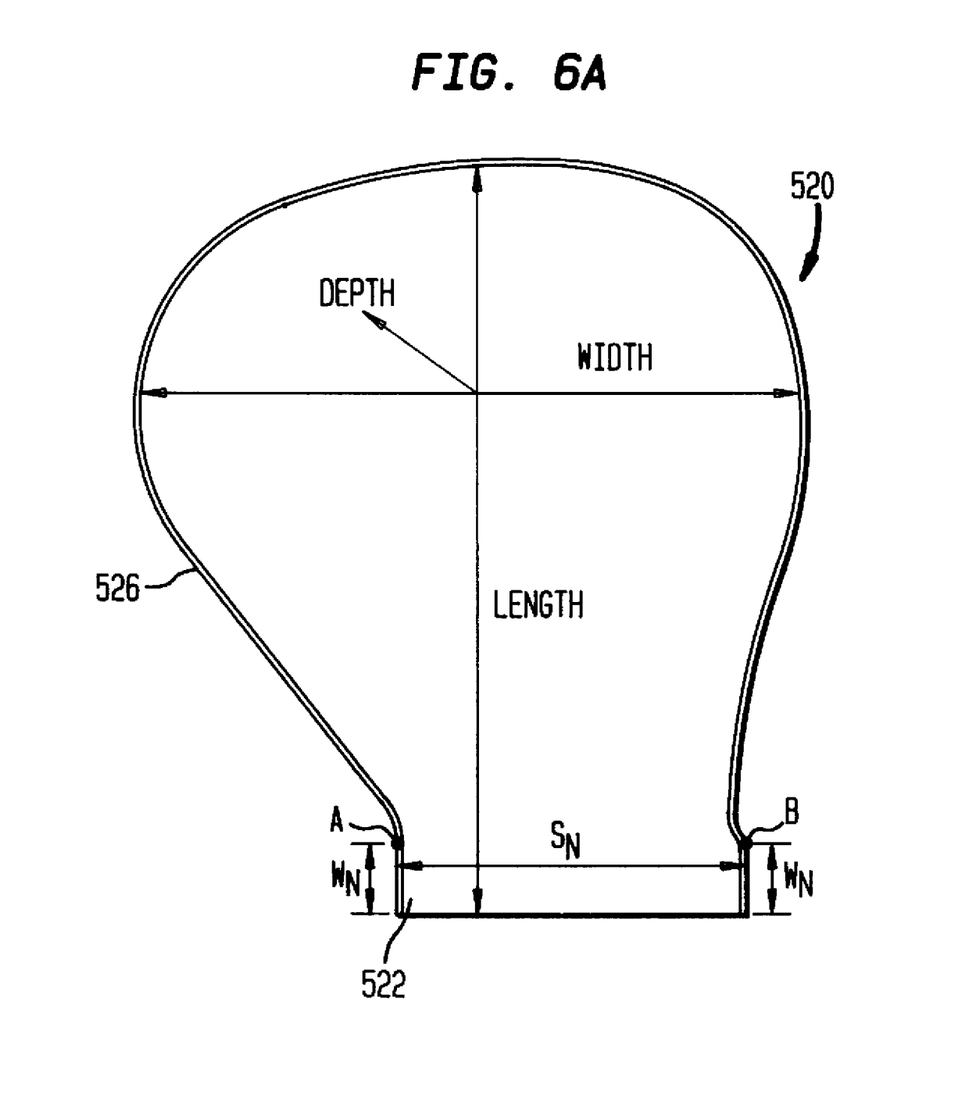
FIG. 6A is a front view showing approximate dimensions for the second reflector embodiment shown in FIG. 5.
Figure 6B:
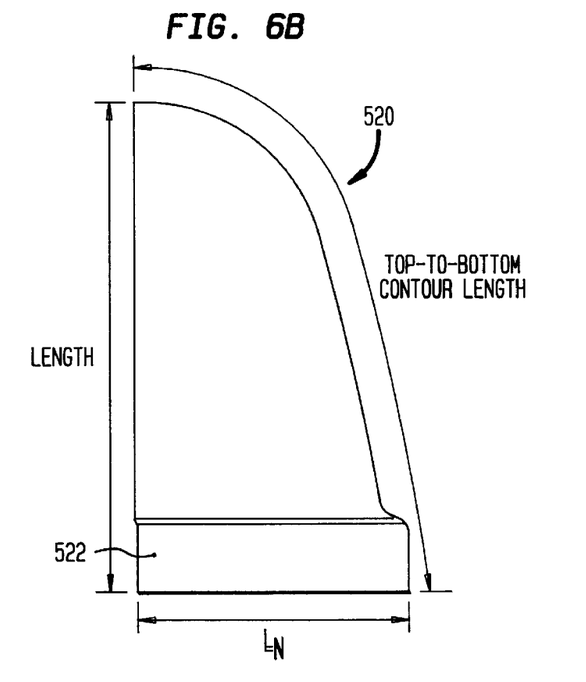
FIG. 6B is a side view showing approximate dimensions for the second reflector embodiment shown in FIG. 5.

Reflector 120 can be any reflector shape that re-directs light from a swivel flash head 110 as described herein. Reflector 120 preferably emits a broad, diffuse light for soft, portrait or dramatic quality lighting. Reflective and/or non-reflective contours for further shaping a softer light, providing fill light, and eliminating harsh shadows can be included in reflector 120. Light bouncers and diffusers can be included integrally with reflector 120 or mounted separately. Reflector 120 can include, but is not limited, to any arcuate and/or non-arcuate shape. Preferably, reflector 120 can include, but is not limited to, either of the two embodiments described below, namely the integral shell reflector embodiment (FIGS. 3A to 3D) and the larger and deeper integral shell reflector compatible with potato masher style flash heads (FIGS. 5, 6A and 6B).

IV. Integral Shell Reflector a. Design

Figure 3A:
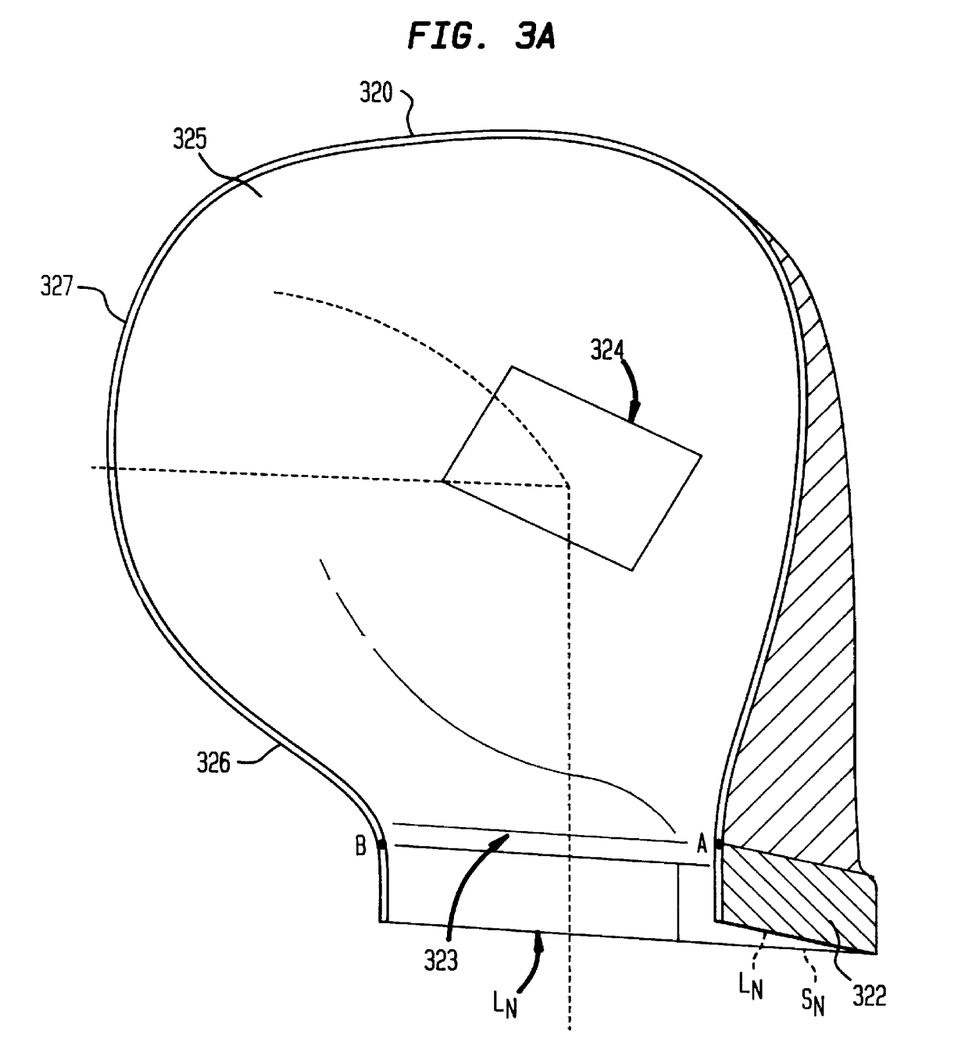
FIG. 3A is a schematic diagram of a perspective frontal view of an integral shell reflector according to a first embodiment of the present invention.

FIGS. 3A to 3D illustrate different views of an integral shell reflector 320 according to one preferred embodiment of the present invention. FIG. 3A shows a perspective view of the front of integral shell reflector 320. Light emitted from a swivel flash head 110 (not shown) travels generally along a first axis in a plane parallel to the paper. The light is directed by reflector 320 along a direction approximately perpendicular to the plane of the first axis, that is, the light is reflected out of the paper.

The reflector 320 is an integral reflector having a three-dimensional concave, "shell" shape. Reflector 320 has a neck region 322 and a reflective region 324. An entrance opening 323 is positioned between the neck and reflective regions 322, 324. An exit opening 325 is positioned adjacent to the reflective region 324 and substantially perpendicular to the entrance opening 323.

The neck region 322 is used to mount the reflector 320 to a side of the swivel flash head. Fastening strip(s) (not shown) are provided in the neck region 322 along one or more of lengths $L_N$ and side $S_N$. The entrance opening 323 receives light emitted from the camera swivel flash head 110 along the first axis in the plane of the paper. Reflective region 324 then reflects the light out through exit opening 325. Reflective region 324 can cover any portion of the reflector 320 surface area beyond the neck region 322. Preferably, reflective region 324 covers the entire interior surface area of reflector 320 to produce a broad, diffuse light.

In a preferred implementation, reflector 320 is an integral shell reflector made of molded plastic. The reflective region 324 is formed by applying a reflective coating, such as, white plastic, over the entire interior of the reflector 320. The reflective region 324 includes reflective contours for softening flash light and providing fill light.

The entrance opening 323 and the exit opening 325 join at two common points A and B. The entrance opening 323 is approximately rectangular to match the particular shape and dimensions of most swivel flash head models. Neck region 322 is arranged in an approximately rectangular U-shape between points A and B. Exit opening 325 is defined by an arcuate path 326 formed by an edge of reflector 320 between points A and B. The asymmetric bulge 327 provides additional fill light. The arcuate path 326 shown is an asymmetric shell shape, but can any arcuate shape, such as, an approximately spherical arc, an approximately elliptical arc, or an approximately U-shaped arc, an approximately teardrop shaped arc, or an approximately asymmetric tearshaped arc.

Figure 3B:
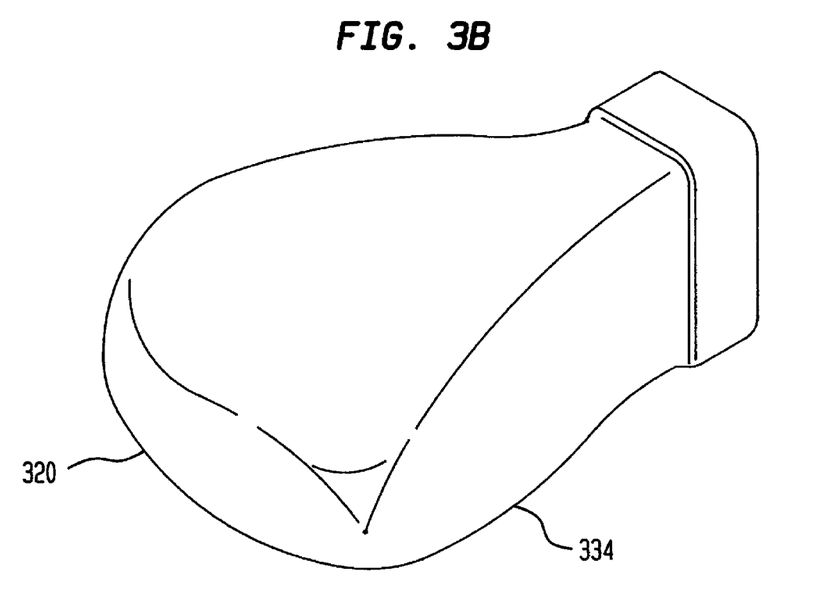
FIG. 3B shows a perspective back view of the integral shell reflector.

FIG. 3B shows an actual perspective view from the back of the reflector 320. A relatively-flat back contour region 334 is shown. The relative flat back contour region 334 corresponds to a slanted region of the reflector 320 where light is re-directed by approximately ninety degrees.

Figure 3C:
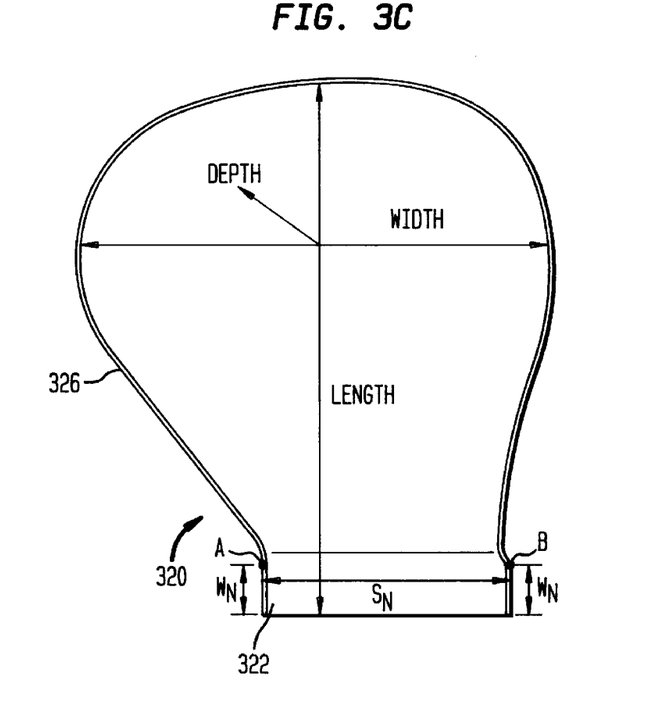
FIG. 3C is a front view showing approximate dimensions for the integral shell reflector.

FIG. 3C shows the following approximate dimensions of the reflector 320: length 7 inches, width 6¼ inches, and depth 2½ inches. The neck region 322 has widths $W_N$ equal to approximately ⅞ inches and a length $S_N$ equal to approximately 2 inches. Arcuate path 326 is approximately 18½ inches.

Figure 3D:
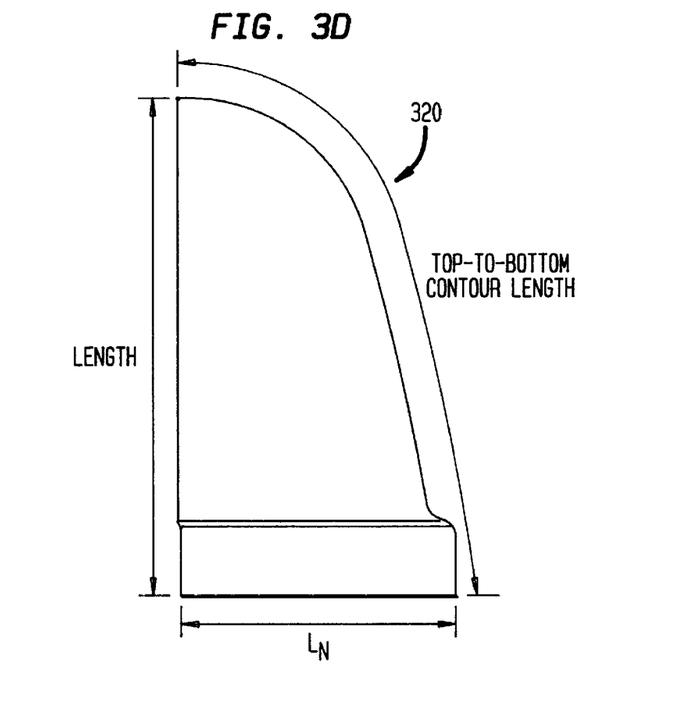
FIG. 3D is a side view showing approximate dimensions for the integral shell reflector.

FIG. 3D shows a side view of the following approximate dimensions of the reflector 320: overall length 7 inches, neck length $L_N$ 3½ inches, and a top to bottom contour length 8¼ inches. All of the dimensions described in FIGS. 3C and 3D are illustrative examples. Reflector 320 can be scaled bigger or smaller depending upon a particular application, shooting environment, photographer preference, camera size, swivel flash head size, or other design preference.

b. Example Starting Instructions

The following are recommended instructions for using a reflector 320 according to the present invention:

i. Mounting the Reflector

1. Clean the swivel flash head surface as per manufacturer's recommendations.

2. Apply loop Velcro® to wide top and bottom sides of swivel flash head, as close to flash rim as possible. (For best results allow four hours for Velcro strip to set.)

ii. Positioning Reflector on Swivel Flash Head

1. Tilt the swivel flash head to normal shooting position.

2. Rotate swivel flash head 90° to the right.

3. Slide the reflector over swivel flash head, lining up the Velcro® strips, and secure into position.

4. To remove, hold swivel flash head securely and peel back from top of the reflector.

iii. Getting Started

Set camera and flash to appropriate ISO. For optimum results, use within 15 ft. of subject.

Option 1 (indoor/outdoor)

1. Set flash to TTL or Auto.

2. Set camera to Program or Auto settings.

Option 2 (indoor with low light)

1. Set strobe to TTL or Auto.

2. Set camera to manual f/5.6 @ 1/30 sec.

With respect to the Positions 1 to 5 shown in FIG. 2, use: Positions 1, 2 for soft portrait light; Position 3 for large horizontal group shots; and Positions 4, 5 for soft dramatic light.

c. Comparison Test

Figure 4A:
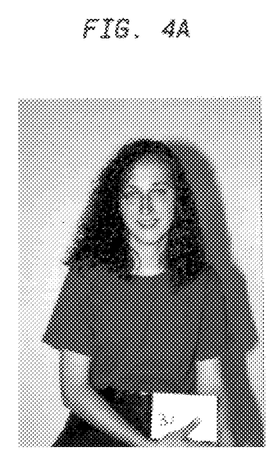
FIG. 4 shows a comparison test between color photographs lighted by a direct flash, a flash using the integral shell reflector according to the first embodiment of the present invention, and a flash using a competing reflector manufactured by Lumiquest.
Figure 4B:
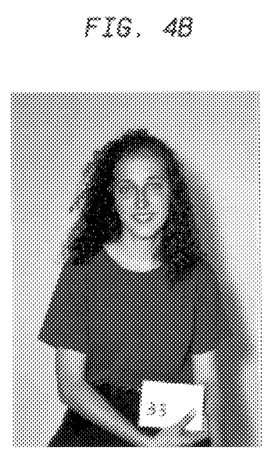
Figure 4C:
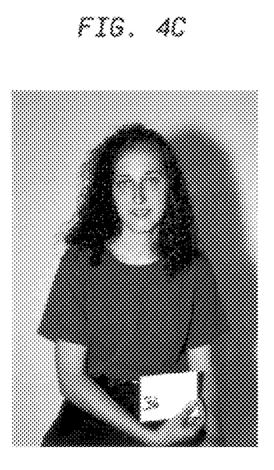

FIG. 4 shows three vertical photographs A, B, and C developed under identical conditions in a comparison test. Each photograph A to C was shot using a Nikon 8008s camera with color film ASA 200, Nikon 85 mm. lens, Nikon SB25 swivel head flash, f-stop at 5.6, and shutter speed at 1/30 of a sec. Photograph A was taken using a direct flash from the swivel flash head pointed at the subject. Photograph B was taken using an integral shell reflector 320 attached to the swivel flash head according to the present invention as described above. Photograph C was taken using a product called "Pocket Bouncer" manufactured by Lumiquest. As evident from the three photographs, the integral shell reflector 320 substantially reduces shadows compared to direct flash and a conventional light bouncer. By keeping the light above the camera lens and with its asymmetric shape providing fill light, the integral shell reflector 320 provides a softer, portrait quality diffuse light that eliminates harsh shadows and red-eye.

V. Reflector Mounted on a Potato Masher Style Swivel Flash Head

FIG. 5 shows a reflector 520 for redirecting light from a potato-masher style swivel flash head 510, according to a second embodiment of the present invention. Potato masher style swivel flash head 510 is connected through a support 508 to camera 500.

Similar to the reflector 120, 320 described above, reflector 520 can direct light from a position above the camera lens unit 505 for both horizontal and vertical camera orientations. FIG. 5 shows reflector 520 in a position 1 corresponding to the position 1 in FIG. 2 as explained above. For brevity, the two other positions 3 and 4 at which the reflector 520 will be above the camera lens unit 505 are shown by dotted lines. Positions 3 and 4 correspond to the like-numbered positions 3 and 4 explained above with respect to FIG. 2. Note when camera 500 is turned in a vertical orientation (not shown), reflector 520 in position 4 is above the camera lens unit 505.

Potato masher style swivel flash head 510 is often used with square format cameras which are not generally turned in a vertical orientation. Using reflector 520, however, still provides soft, portrait or dramatic quality light and fill light because of its asymmetric shape compared to a direct flash. Harsh shadows are reduced or eliminated compared to a direct flash.

Reflector 520 differs from reflector 320 only that it has a neck region that is slightly larger and a slightly deeper reflective region to accommodate a larger potato masher style swivel flash head 510. FIG. 6A shows the following approximate dimensions of the reflector 520: length 7 inches, width 6¼ inches, and depth 3½ inches. The neck region 522 has widths $W_N$ equal to approximately ⅞ inches and a length $S_N$ equal to approximately 3 inches. Arcuate path 526 is approximately 18½ inches.

FIG. 6B shows a side view of the following approximate dimensions of the reflector 520: overall length 7 inches, neck length $L_N$ 4½ inches, and a top to bottom contour length 9 inches. All of the dimensions described in FIGS. 6A and 6B are illustrative examples. Reflector 520 can be scaled bigger or smaller depending upon a particular application, shooting environment, photographer preference, camera size, swivel flash head size, or other design preference.

Fastening strips are also provided on all four sides of the potato masher style swivel flash head 510 for attachment to the three sides of the neck region 522 (one side $S_N$ and two lengths $L_N$) of reflector 520. A separate fastening strip (not shown) is used across the open face of a neck region 522 between points A and B for attaching to the remaining fourth side of the swivel flash head 510.

Similar starting instructions, as described in a detailed example above, can be used with respect to reflector 520 and camera 500.

VI. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An apparatus for providing light for a field of view of a camera, the camera having a camera lens unit that faces in a forward direction toward the camera field of view, and a swivel flash head that can emit light in a side direction at an angle with respect to a vertical plane relative to the camera, comprising:

a reflector; wherein, said reflector includes:

a neck region that couples said reflector to a side of the swivel flash head, and a reflective region that receives the light emitted from the swivel flash head traveling in the side direction and re-directs the received light to illuminate the camera field of view from positions above the camera lens unit when the camera is oriented within a range of camera orientations, said range of camera orientations including horizontal and vertical camera orientations.

2. The apparatus of claim 1, wherein said reflective region reflects light from the swivel flash head approximately 90 degrees to illuminate the camera field of view.

3. The apparatus of claim 1, wherein said reflector comprises an integral reflector made of molded plastic having a reflective interior surface.

4. The apparatus of claim 1, wherein said reflector attaches flush on a side of the swivel flash head.

5. The apparatus of claim 1, further comprising at least one fastener that removably attaches said neck region around the swivel flash head.

6. The apparatus of claim 5, wherein said at least one fastener comprises at least one fastener strip.

7. The apparatus of claim 1, wherein said reflective region comprises a concave reflective surface, whereby, a soft, diffuse light illuminates the camera field of view.

8. The apparatus of claim 7, wherein said concave reflective surface further includes an asymmetrical bulge for providing fill light in the camera field of view.

9. The apparatus of claim 8, wherein said reflector comprises an integral shell reflector.

10. The apparatus of claim 1, wherein said reflector comprises an integral shell reflector.

11. The apparatus of claim 10, wherein said integral shell reflector is dimensioned to fit flush on a side of the swivel flash head, and wherein the swivel flash head is mounted on top of the camera above the camera lens unit.

12. The apparatus of claim 11, wherein said integral shell reflector is dimensioned to fit flush on a side of a potato masher style swivel flash head.

13. The apparatus of claim 1, wherein said reflector further comprises:

an entrance opening positioned between said neck and reflective regions; and an exit opening positioned adjacent to said reflective region and substantially perpendicular to said entrance opening; wherein, said entrance opening receives said light emitted from the camera swivel flash head along a first axis in a first plane, said first plane being approximately perpendicular to an optical axis of the camera lens unit, and said reflective region reflects said light received through said entrance opening out through said exit opening.

14. The apparatus of claim 13, wherein said entrance opening and said exit opening join at two common points A and B, said entrance opening includes three sides arranged in an approximately rectangular U-shape between points A and B, and said exit opening follows an arcuate path between points A and B.

15. The apparatus of claim 14, wherein said arcuate path comprises at least one of an approximately shell-shaped arc, approximately spherical arc, an approximately elliptical arc, or an approximately U-shaped arc, an approximately teardrop shaped arc, or an approximately asymmetric tearshaped arc.

16. The apparatus of claim 13, wherein said reflective region comprises a concave reflective surface, whereby, a soft, diffuse light illuminates the camera field of view.

17. The apparatus of claim 16, wherein said concave reflective surface further includes an asymmetrical bulge for providing fill light in the camera field of view.

18. An apparatus for providing light for a camera having a camera lens unit and a swivel flash head, comprising:

a reflector; wherein, said reflector includes:

a neck region that couples said reflector to the swivel flash head, and a reflective region that directs light emitted from the swivel flash head at positions above the camera lens unit when the camera is oriented within a range of camera orientations, said range of camera orientations including horizontal and vertical camera orientations, wherein the light at said positions above the camera lens unit is centered by the reflector at spots having a vertical displacement substantially above the camera lens unit and an offset angle from vertical, said vertical displacement being within a range of approximately 5 to 13 inches and said offset angle being within a range of approximately +60 degrees to −60 degrees.

19. A method for providing lighting for a camera having a camera lens unit, comprising the steps of:

mounting a swivel flash head on the camera;

attaching a reflector to said swivel flash head;

emitting light from said swivel flash head along a side direction at an angle with respect to a vertical plane relative to the camera; and reflecting said light from said reflector to illuminate a camera field of view from positions above the camera lens unit when the camera is oriented within a range of camera orientations, said range of camera orientations including horizontal and vertical camera orientations.

20. The method of claim 19, wherein said attaching step comprises attaching said reflector to a side of said swivel flash head.

21. The method of claim 19, wherein said attaching step comprises attaching an integral shell reflector to said swivel flash head; whereby, a soft, diffuse light illuminates a field of view of the camera producing less shadow and red-eye compared to light emitted directly from the swivel flash head.

22. A reflector for providing light for a camera having a camera lens unit and a swivel flash head, comprising:

a neck region that couples the reflector to the swivel flash head, and a reflective region that re-directs light emitted from the swivel flash head traveling in a side direction at an angle with respect to a vertical plane relative to the camera to illuminate a camera field of view from positions above the camera lens unit when the camera is oriented within a range of camera orientations, said range of camera orientations including horizontal and vertical camera orientations; whereby a soft, diffuse light illuminates a camera field of view producing less shadow and red-eye compared to light emitted directly from the swivel flash head.

* * * * *